(12) United States Patent
Stanley

(10) Patent No.: US 8,140,419 B2
(45) Date of Patent: Mar. 20, 2012

(54) SYSTEM AND METHOD FACILITATING COMPETITIVE ADVANTAGE IN ISSUING FINANCIAL PAPER

(76) Inventor: Neil A. Stanley, Omaha, NE (US)

( * ) Notice: Subject to any disclaimer, the term of this patent is extended or adjusted under 35 U.S.C. 154(b) by 0 days.

(21) Appl. No.: 12/501,571

(22) Filed: Jul. 13, 2009

(65) Prior Publication Data

US 2009/0319437 A1 Dec. 24, 2009

Related U.S. Application Data

(63) Continuation of application No. 11/760,151, filed on Jun. 8, 2007, now abandoned.

(60) Provisional application No. 60/814,151, filed on Jun. 16, 2006.

(51) Int. Cl.
*G06Q 40/00* (2012.01)

(52) U.S. Cl. .......................... 705/35; 705/36 R; 705/39

(58) Field of Classification Search .................... 705/35, 705/36 R, 39
See application file for complete search history.

(56) References Cited

U.S. PATENT DOCUMENTS

| | | | |
|---|---|---|---|
| 6,401,070 B1 | 6/2002 | McManus et al. | |
| 7,756,767 B2 * | 7/2010 | Cluse et al. | 705/36 R |
| 2002/0174048 A1 * | 11/2002 | Dheer et al. | 705/36 |
| 2004/0059670 A1 | 3/2004 | Mills | |
| 2005/0108154 A1 * | 5/2005 | McLiesh et al. | 705/39 |
| 2005/0182702 A1 | 8/2005 | Williams, III | |

OTHER PUBLICATIONS

Valuing the Withdrawal Option in Retail CD Portfolios by James Gilkeson and Craig Ruff, Journal of Financial Services Research, 1996.*
http://www.bankrate.com/brm/news/sav/20020805d.asp.*
Gilkeson, James H, Ruff, Craig K. (1996). Valuing the withdrawal option in retail CD portfolios. Journal of Financial Services Research, 10(4).333-358. Retrieved Apr. 3, 2009, from ABIIINFORM Global database. (Document 10: 11843414).
Jonathan Lansner:The Register. (Apr. 25, 1988). To break. or not to break? If you need money now, busting a CD might be better than a loan :[Evening Edition]. Orange County Register,p. C01. Retrieved Apr. 3, 2009. from Business Dateline database. (Document 10: 146896881).
www.vikingsavings.com website.
CDs are not Risk-Free, so Shop Around :[One Star Edition). (Apr. 15, 2002). Pittsburgh Post—Gazette,p. B-2. Retrieved Apr. 3, 2009, from Business Dateline database. (Document 10: 113699016).

* cited by examiner

*Primary Examiner* — Shahid Merchant
(74) *Attorney, Agent, or Firm* — Advent IP, P.C., L.L.O.

(57) ABSTRACT

Financial instruments, particularly time certificates of deposit issued primarily by banks in the form of a contract between the depositor and the financial depository to typically pay an fixed interest rate for a fixed period of time at which redemption may occur. In the U.S. these contracts are required by Truth in Savings Regulation DD to state at the time of account opening the penalty for early withdrawal. These penalties can not be revised by the depository prior to maturity. The penalty for early withdrawal is the deterrent to allowing depositors to take advantage of subsequent enhanced investment opportunities during the term of the instrument. The withdrawal penalty is usually stated as a number of days/months of lost interest. In certain interest rate environments, this penalty may be Insufficient to discourage depositors from redeeming their deposit despite the penalty. At present, if a depositor does redeem, they must purchase a new CD for a fixed term which will tend to lengthen the term of deposit. The present invention overcomes this handicap by formulating a shorter term CD to make up the remainder of the term of the original CD.

12 Claims, 6 Drawing Sheets

| Net Benefit to Transfer | | | |
|---|---|---|---|
| Analysis for Non-Compounded CDs | | | |
| Current CD Amount | | | 100,000 |
| Current Cash Available to Withdraw | | | 98,000 |
| Early Withdrawal Penalty | | | 2,000 |
| Current Interest Rate | | | 4.00% |
| Maturity Date | | | 6/2/2010 |
| Assumed Transfer Date | | | 3/31/2007 |
| Term to Maturity | | days | 1159 |
| | | years | 3.17 |
| Reinvested CD Rate | | | 5.10% |
| Current Interest Payments | Monthly | | 333 |
| | Quarterly | | 1,000 |
| | Semi-annually | | 2,000 |
| | Annually | | 4,000 |
| Reinvested Interest Payments | Monthly | | 417 |
| | Quarterly | | 1,250 |
| | Semi-annually | | 2,499 |
| | Annually | | 4,998 |
| Additional Interest | Monthly | | 83 |
| | Quarterly | | 250 |
| | Semi-annually | | 499 |
| | Annually | | 998 |
| | Total | | 3,166 |
| Amortization of Penalty | Monthly | | 53 |
| | Quarterly | | 155 |
| | Semi-annually | | 315 |
| | Annually | | 630 |
| | Total | | 2,000 |
| Net Benefit to Transfer | Monthly | | 31 |
| | Quarterly | | 92 |
| | Semi-annually | | 184 |
| | Annually | | 368 |
| Total Net Benefit to Transfer | | | 1,166 |

Net Benefit to Transfer

Analysis for Non-Compounded CDs

| | | |
|---|---|---|
| Current CD Amount | | 100,000 |
| Current Cash Available to Withdraw | | 98,000 |
| Early Withdrawal Penalty | | 2,000 |
| Current Interest Rate | | 4.00% |
| Maturity Date | | 6/2/2010 |
| Assumed Transfer Date | | 3/31/2007 |
| | | |
| Term to Maturity | days | 1159 |
| | years | 3.17 |
| | | |
| Reinvested CD Rate | | 5.10% |
| | | |
| Current Interest Payments | Monthly | 333 |
| | Quarterly | 1,000 |
| | Semi-annually | 2,000 |
| | Annually | 4,000 |
| | | |
| Reinvested Interest Payments | Monthly | 417 |
| | Quarterly | 1,250 |
| | Semi-annually | 2,499 |
| | Annually | 4,998 |
| | | |
| Additional Interest | Monthly | 83 |
| | Quarterly | 250 |
| | Semi-annually | 499 |
| | Annually | 998 |
| | Total | 3,166 |
| | | |
| Amortization of Penalty | Monthly | 53 |
| | Quarterly | 158 |
| | Semi-annually | 315 |
| | Annually | 630 |
| | Total | 2,000 |
| | | |
| Net Benefit to Transfer | Monthly | 31 |
| | Quarterly | 92 |
| | Semi-annually | 184 |
| | Annually | 368 |
| Total Net Benefit to Transfer | | 1,166 |

FIGURE 3

Net Benefit to Transfer Table
Analysis for Non-Compounded CDs

| Date | \multicolumn{11}{c}{Reinvested CD Rate} |
| --- | --- | --- | --- | --- | --- | --- | --- | --- | --- | --- | --- |
| | 4.80% | 4.90% | 5.00% | 5.10% | 5.20% | 5.30% | 5.40% | 5.50% | 5.60% | 5.70% | 5.80% |
| 3/31/2007 | 233 | 544 | 855 | 1,166 | 1,477 | 1,788 | 2,099 | 2,409 | 2,720 | 3,031 | 3,342 |
| 4/30/2007 | 175 | 477 | 780 | 1,083 | 1,385 | 1,688 | 1,991 | 2,294 | 2,596 | 2,899 | 3,202 |
| 5/31/2007 | 116 | 410 | 705 | 1,000 | 1,294 | 1,589 | 1,883 | 2,178 | 2,472 | 2,767 | 3,061 |
| 6/30/2007 | 57 | 344 | 630 | 916 | 1,203 | 1,489 | 1,776 | 2,062 | 2,348 | 2,635 | 2,921 |
| 7/31/2007 | (1) | 277 | 555 | 833 | 1,111 | 1,390 | 1,668 | 1,946 | 2,224 | 2,502 | 2,781 |
| 8/31/2007 | (60) | 210 | 480 | 750 | 1,020 | 1,290 | 1,560 | 1,830 | 2,100 | 2,370 | 2,640 |
| 9/30/2007 | (119) | 143 | 405 | 667 | 929 | 1,191 | 1,453 | 1,714 | 1,976 | 2,238 | 2,500 |
| 10/31/2007 | (177) | 76 | 330 | 584 | 837 | 1,091 | 1,345 | 1,599 | 1,852 | 2,106 | 2,360 |
| 11/30/2007 | (236) | 9 | 255 | 501 | 746 | 992 | 1,237 | 1,483 | 1,728 | 1,974 | 2,219 |
| 12/31/2007 | (295) | (57) | 180 | 417 | 655 | 892 | 1,130 | 1,367 | 1,604 | 1,842 | 2,079 |
| 1/31/2008 | (353) | (124) | 105 | 334 | 563 | 793 | 1,022 | 1,251 | 1,480 | 1,709 | 1,939 |
| 2/29/2008 | (412) | (191) | 30 | 251 | 472 | 693 | 914 | 1,135 | 1,356 | 1,577 | 1,798 |
| 3/31/2008 | (471) | (258) | (45) | 168 | 381 | 594 | 807 | 1,019 | 1,232 | 1,445 | 1,658 |
| 4/30/2008 | (529) | (325) | (120) | 85 | 289 | 494 | 699 | 904 | 1,108 | 1,313 | 1,518 |
| 5/31/2008 | (588) | (392) | (195) | 2 | 198 | 395 | 591 | 788 | 984 | 1,181 | 1,377 |
| 6/30/2008 | (647) | (458) | (270) | (82) | 107 | 295 | 484 | 672 | 860 | 1,049 | 1,237 |
| 7/31/2008 | (705) | (525) | (345) | (165) | 15 | 196 | 376 | 556 | 736 | 916 | 1,097 |
| 8/31/2008 | (764) | (592) | (420) | (248) | (76) | 96 | 268 | 440 | 612 | 784 | 956 |
| 9/30/2008 | (823) | (659) | (495) | (331) | (167) | (3) | 161 | 324 | 488 | 652 | 816 |
| 10/31/2008 | (881) | (726) | (570) | (414) | (259) | (103) | 53 | 209 | 364 | 520 | 676 |
| 11/30/2008 | (940) | (793) | (645) | (497) | (350) | (202) | (55) | 93 | 240 | 388 | 535 |
| 12/31/2008 | (999) | (859) | (720) | (581) | (441) | (302) | (162) | (23) | 116 | 256 | 395 |
| 1/31/2009 | (1,057) | (926) | (795) | (664) | (533) | (401) | (270) | (139) | (8) | 123 | 255 |
| 2/28/2009 | (1,116) | (993) | (870) | (747) | (624) | (501) | (378) | (255) | (132) | (9) | 114 |
| 3/31/2009 | (1,175) | (1,060) | (945) | (830) | (715) | (600) | (485) | (371) | (256) | (141) | (26) |
| 4/30/2009 | (1,233) | (1,127) | (1,020) | (913) | (807) | (700) | (593) | (486) | (380) | (273) | (166) |
| 5/31/2009 | (1,292) | (1,194) | (1,095) | (996) | (898) | (799) | (701) | (602) | (504) | (405) | (307) |
| 6/30/2009 | (1,351) | (1,260) | (1,170) | (1,080) | (989) | (899) | (808) | (718) | (628) | (537) | (447) |
| 7/31/2009 | (1,409) | (1,327) | (1,245) | (1,163) | (1,081) | (998) | (916) | (834) | (752) | (670) | (587) |
| 8/31/2009 | (1,468) | (1,394) | (1,320) | (1,246) | (1,172) | (1,098) | (1,024) | (950) | (876) | (802) | (728) |
| 9/30/2009 | (1,527) | (1,461) | (1,395) | (1,329) | (1,263) | (1,197) | (1,131) | (1,066) | (1,000) | (934) | (868) |
| 10/31/2009 | (1,585) | (1,528) | (1,470) | (1,412) | (1,355) | (1,297) | (1,239) | (1,181) | (1,124) | (1,066) | (1,008) |

FIGURE 4

Net Benefit to Transfer
Analysis for Compounded CDs

Current CD Structure

| | |
|---|---|
| Date | 06/02/05 |
| Balance | 92,985 |
| Rate | 4.00% |
| Compound Frequency | 4 |
| Estimated APY | 4.06% |
| Term to Maturity | 60 months |
| Maturity Date | 06/02/10 |
| Expected Value at CD Maturity | 113,459 |
| | |
| Current Date | 03/31/07 |
| Months Held | 22 |
| Remaining Months to Maturity | 38 |
| Expected Current Value | 100,000 |
| Balance to Calculate Penalty On | 100,000 |
| Conventional Penalty Term Disclosed to Customer | 6 months |
| Conventional Penalty | 2,000 |
| Liquid Current Value of CD | 98,000 |

The Reissue Opportunity

| | |
|---|---|
| New CD Rate Opportunity for Remaining Term | 5.10% |
| Reinvested CD Amount | 98,000 |
| Reinvested APY with Quarterly Compounding | 5.20% |
| Remaining CD Term | 38 months |
| Reinvested CD Maturity | 06/02/10 |
| Expected Value at CD Maturity | 115,094 |

| Net Benefit to Transfer | $ 1,635 |
|---|---|

FIGURE 5

Net Benefit to Transfer Table
Analysis for Compounded CDs

| Date | 4.80% | 4.90% | 5.00% | 5.10% | 5.20% | 5.30% | 5.40% | 5.50% | 5.60% | 5.70% | 5.80% |
|---|---|---|---|---|---|---|---|---|---|---|---|
| 3/31/2007 | 558 | 915 | 1,274 | 1,635 | 1,996 | 2,358 | 2,721 | 3,085 | 3,450 | 3,817 | 4,184 |
| 4/30/2007 | 483 | 832 | 1,181 | 1,532 | 1,883 | 2,235 | 2,589 | 2,943 | 3,299 | 3,655 | 4,012 |
| 5/31/2007 | 407 | 745 | 1,085 | 1,426 | 1,767 | 2,109 | 2,453 | 2,797 | 3,142 | 3,488 | 3,835 |
| 6/30/2007 | 333 | 662 | 992 | 1,323 | 1,655 | 1,987 | 2,321 | 2,655 | 2,990 | 3,327 | 3,664 |
| 7/31/2007 | 256 | 576 | 896 | 1,217 | 1,539 | 1,861 | 2,185 | 2,509 | 2,834 | 3,160 | 3,487 |
| 8/31/2007 | 180 | 490 | 800 | 1,111 | 1,423 | 1,736 | 2,049 | 2,363 | 2,678 | 2,994 | 3,310 |
| 9/30/2007 | 106 | 406 | 707 | 1,009 | 1,311 | 1,614 | 1,918 | 2,222 | 2,527 | 2,833 | 3,140 |
| 10/31/2007 | 30 | 320 | 611 | 903 | 1,195 | 1,488 | 1,782 | 2,077 | 2,372 | 2,667 | 2,964 |
| 11/30/2007 | (44) | 237 | 519 | 801 | 1,084 | 1,367 | 1,651 | 1,936 | 2,221 | 2,507 | 2,794 |
| 12/31/2007 | (120) | 151 | 423 | 695 | 968 | 1,242 | 1,516 | 1,791 | 2,066 | 2,342 | 2,618 |
| 1/31/2008 | (196) | 65 | 327 | 590 | 853 | 1,117 | 1,381 | 1,646 | 1,911 | 2,177 | 2,443 |
| 2/29/2008 | (268) | (15) | 238 | 491 | 745 | 1,000 | 1,255 | 1,510 | 1,766 | 2,023 | 2,280 |
| 3/31/2008 | (344) | (101) | 142 | 386 | 630 | 875 | 1,120 | 1,366 | 1,612 | 1,858 | 2,105 |
| 4/30/2008 | (417) | (184) | 50 | 284 | 519 | 754 | 990 | 1,226 | 1,462 | 1,699 | 1,936 |
| 5/31/2008 | (493) | (269) | (45) | 179 | 404 | 630 | 855 | 1,081 | 1,308 | 1,535 | 1,762 |
| 6/30/2008 | (567) | (352) | (137) | 78 | 293 | 509 | 725 | 942 | 1,159 | 1,376 | 1,594 |
| 7/31/2008 | (642) | (438) | (232) | (27) | 179 | 385 | 591 | 798 | 1,005 | 1,212 | 1,420 |
| 8/31/2008 | (718) | (523) | (327) | (132) | 64 | 261 | 457 | 654 | 851 | 1,049 | 1,247 |
| 9/30/2008 | (791) | (606) | (419) | (233) | (46) | 141 | 328 | 515 | 703 | 891 | 1,079 |
| 10/31/2008 | (867) | (691) | (514) | (338) | (161) | 17 | 194 | 372 | 550 | 728 | 906 |
| 11/30/2008 | (940) | (773) | (606) | (439) | (271) | (103) | 65 | 233 | 402 | 570 | 739 |
| 12/31/2008 | (1,016) | (858) | (701) | (543) | (385) | (227) | (68) | 90 | 249 | 408 | 567 |
| 1/31/2009 | (1,091) | (944) | (795) | (647) | (499) | (350) | (202) | (53) | 96 | 246 | 395 |
| 2/28/2009 | (1,160) | (1,020) | (881) | (741) | (602) | (462) | (322) | (182) | (41) | 99 | 240 |
| 3/31/2009 | (1,235) | (1,105) | (975) | (845) | (715) | (585) | (455) | (324) | (193) | (63) | 68 |
| 4/30/2009 | (1,308) | (1,187) | (1,067) | (946) | (825) | (704) | (583) | (462) | (341) | (219) | (98) |
| 5/31/2009 | (1,383) | (1,272) | (1,161) | (1,050) | (939) | (827) | (716) | (604) | (492) | (381) | (269) |
| 6/30/2009 | (1,456) | (1,354) | (1,252) | (1,150) | (1,048) | (946) | (844) | (741) | (639) | (537) | (434) |
| 7/31/2009 | (1,532) | (1,439) | (1,347) | (1,254) | (1,161) | (1,069) | (976) | (883) | (790) | (698) | (605) |
| 8/31/2009 | (1,607) | (1,524) | (1,441) | (1,358) | (1,275) | (1,191) | (1,108) | (1,025) | (942) | (858) | (775) |
| 9/30/2009 | (1,679) | (1,606) | (1,532) | (1,458) | (1,384) | (1,310) | (1,236) | (1,162) | (1,088) | (1,014) | (940) |
| 10/31/2009 | (1,755) | (1,690) | (1,626) | (1,561) | (1,497) | (1,432) | (1,368) | (1,303) | (1,239) | (1,174) | (1,109) |

Column group header: Reinvested CD Rate

Row label (vertical, left side): Date of Transfer

FIGURE 6

SYSTEM AND METHOD FACILITATING COMPETITIVE ADVANTAGE IN ISSUING FINANCIAL PAPER

CROSS-REFERENCE TO RELATED APPLICATION

This application is a continuation of application Ser. No. 11/760,151, filed 8 Jun. 2007 now abandoned which claims the benefit of U.S. Provisional Application Ser. No. 60/814,151 filed on 16 Jun. 2006, the complete subject matter of each of which is hereby incorporated herein by reference in its entirety.

TECHNICAL FIELD

The field of invention is the creation of specialized financial instruments, most commonly certificates of deposits (CDs).

BACKGROUND

Financial instruments, particularly time certificates of deposit issued primarily by banks in the form of a contract between the depositor and the financial depository to typically pay a fixed interest rate for a fixed period of time at which redemption may occur. These instruments are typically not callable by the bank but redeemable by the depositor before maturity, subject to an early withdrawal penalty. In the U.S. these contracts are required by Truth in Savings Regulation DD to state at the time of account opening the penalty for early withdrawal. These penalties can not be revised by the depository prior to maturity.

Since their introduction, bank CDs have been marketed as relatively simple financial instruments. These CDs provide secure, fixed income to the depositors at interest rates that are more attractive than checking or savings. The depositor investing in CDs has traded liquidity for income. They have acknowledged that there is a "substantial penalty for early withdrawal" and have accepted that for the opportunity to get a higher yielding, FDIC insured, fixed rate investment. CD yields have not been regulated for several decades. Individual banks control the yields offered to depositors. With individual banks continually adjusting yields on each term differentials occur over time, between banks and within the offerings of individual banks.

CDs have historically provided banks with a stable source of funds at a known interest cost. This has allowed banks to lock-in interest margins on longer-term investments in loans and securities by utilizing CD funding. Banks have modeled their future earnings based on these contracts they have with depositors to pay a fixed rate of interest for a fixed period of time.

Truth in Savings Regulation DD specifies the rules for handling CD interest. The documentation of each CD will specify the selected compounding and crediting options and periods for that instrument. The frequency of compounding or crediting interest is not specified by regulation. CDs are either "Compounded CDs" or "CDs which are not compounded".

"Compounded CDs" reinvest the interest periodically to the CD and grow the value of the CD to maturity. At any point in time the total current account value of the CD is equal to the principal and accrued interest balances. Periodically, the accrued interest will be credited to the principal balance and the new principal balance will earn interest at the interest rate of the CD.

"CDs which are not compounded" (non-compound CD) have interest paid to the account holder or credited to other accounts on a periodic basis. CDs which are not compounded have a principal value of the CD that remains constant throughout the life of the deposit. At any point in time the total current account value of the CD is equal to the principal and accrued interest balances. Periodically, the accrued interest will be paid to the account holder or credited to other accounts. Interest will accrue on the same principal balance throughout the life of the CDs which are not compounded.

The current net cash value of a CD at any time is calculated by subtracting any applicable early withdrawal penalty from the total current account value of the CD (total of principal and accrued interest balances).

History of Early Withdrawal

Early withdrawal of CDs has not been a problem for the banking industry. The depositors are well aware that there is a "substantial penalty for early withdrawal". The banks have generally maintained the same penalty language in their contracts with depositors ever since they began offering CDs. CD customers were not interested in early withdrawal as interest rates declined since virtually all CDs on the books had higher interest rates than those being newly offered.

When providing interest rate information to customers, banks must, by current law, quote an Annual Percentage Yield (APY), a percentage rate that reflects the total amount of interest paid on an account; it is based on the interest rate and the frequency of compounding for a 365-day period. This is a very simple calculation.

The liquidation value of other fixed rate investment securities is determined by present valuing the interest rate over the term of the investment at the current market yield. The present value method of valuation is more complex and difficult to calculate than a simple interest forfeiture penalty traditionally found in CDs. Interest forfeiture is simple to understand and calculate without a computer and was considered to be appropriate for the bank CD customer when they were introduced. Not only was the forfeiture penalty disclosed, but banks were also required to warn depositors that there was a "substantial penalty for early withdrawal". At this time, it is unlikely that many CD customers are aware that the penalties embedded in their investments are not economically substantial.

Interest Rate Environment

The present economic environment is a result of significant changes in interest rates over the last three decades. After the five-year constant maturing US Treasury index peaked in September 1981 at 15.93% according to FederalReserve.gov records, interest rates generally trended downward until this same index hit a low of 2.27% in June 2003. As of Apr. 15, 2006 the current five-year US Treasury yield is 4.97%.

With the elimination of deposit rate ceilings in the early 1980's, customers and banks observed that a 3-month early withdrawal penalty on 12% certificates was substantial. In the typical interest forfeiture approach the early withdrawal penalty is a function of the CD rate. The higher the certificate's rate of interest the higher the penalty. The 1982 CD at 12% with 3-month penalty would have had a 3% early withdrawal penalty. As of 2006, a 3% CD with the same penalty structure results in a penalty of only 0.75%. The impact of the penalty has fallen with the interest rate.

The penalty for early withdrawal is the deterrent to allowing depositors to take advantage of subsequent enhanced investment opportunities during the term of the instrument. The withdrawal penalty is usually stated as a number of days/months of lost interest. Customer inertia is a strong force to overcome, and interest penalties tend to be a major barrier in the mind of the purchaser.

When rates decline there is little reason for banks to be concerned about the significance of early withdrawal penalties. If however, interest rates go up economics allow depositors who hold CDs with insufficient early withdrawal penalties to improve their financial position without any risk to the depositor, but their banks will be at risk of losing significant deposits. Furthermore, the first banks which encourage early withdrawal and redemption of CDs despite their penalty, may cause a flood of withdrawals.

If the customer (depositor) takes early redemption, there are several negative consequences for the bank. First, the bank must cover the lost funds by going into other, more expensive spot markets to maintain its deposit levels. Second, the bank may try to sell a new CD but the interest cost to the bank will inherently be higher (otherwise there would not have been any redemption). Third, there are significant transaction costs to selling replacement CDs to those who have redeemed.

From the point of view of a competitive bank, getting CD holders from other banks to redeem their instruments and bring their deposits over to the new bank at maturity or earlier is highly attractive. The value of core retail deposits as reflected in acquisitions of bank deposits by other banks is material with many deposit premiums reported in the range of 4% to 7%. These premiums on retail deposits exist because CD owners have a predisposition to purchase another CD and other financial products with relatively less marketing effort by the bank once a relationship is established. The problem is essentially one of convincing the customer to redeem the old CD, choose the new bank, and make the purchase.

It is perhaps the convincing step which creates the greatest challenge. One problem of redeeming a CD and purchasing a new one is that the CDs are conventionally sold for specific time periods (such as 6 mo., 1 year, 2 years etc.). Traditionally, the purchaser of a new CD of similar term to maturity of the old one would necessarily increase the overall maturity date as measured from the start date of the original CD to the maturity date of the new CD.

This may be a serious impediment to closing the sale to reissue a CD. The buyer has to be convinced that the whole process of redemption and reissue is worth the bother, but if the date to maturity is extended, this may be just one step too far. A fatal impediment.

In other industries, such as the mobile (cell) phone industry, the extension of contracts has been a strong disincentive for customers to make a change in the contract no matter how desirable the new terms are.

Alternative CD Structures

Two types of CDs are available with regard to handling interest. CDs are either "Compounded CDs" or "CDs which are not compounded".

"Compounded CDs" reinvest the interest periodically to the CD and grow the value of the CD to maturity. At any point in time the total current account value of the CD is equal to the principal and accrued interest balances. Periodically, the accrued interest will be credited to the principal balance and the new principal balance will earn interest at the interest rate of the CD. Depositors who want to keep a high proportion of their funds earning relatively high interest rates and do not need cashflow from their CDs generally take this option.

"CDs which are not compounded" (non-Compound CD) have interest paid to the account holder or credited to other accounts on a periodic basis. CDs which are not compounded have a principal value of the CD that remains constant throughout the life of the deposit. At any point in time the total current account value of the CD is equal to the principal and accrued interest balances. Periodically, the accrued interest will be paid to the account holder or credited to other accounts. Interest will accrue on the same principal balance throughout the life of the CDs which are not compounded. Depositors who would like or need cash for on-going financial needs generally take this option.

The current net cash value of a CD at any time is calculated by subtracting any applicable early withdrawal penalty from the total current account value of the CD (total of principal and accrued interest balances).

Each contact a depositor makes with their current bank to investigate or execute the re-issuance of their current CDs with another bank represents an opportunity for the current bank to interfere or distract the depositor. The most effective way to prepare for analysis of the re-issuance benefit is to gather data directly from the current bank. The most effective method to gather this data would be for the bank to receive acceptable authorization from the depositor to investigate the parameters of the existing deposit. This authorization would be similar to the payoff information request form used with real estate mortgage refinance today. This method would facilitate an efficient and accurate way to compile the necessary details of existing deposits such as maturity dates, total cash value at maturity, current net cash value after any applicable penalties. The bank could also inquire of the current APY offered on the same term of the deposit currently being considered for re-issuance to be used as a marketing differentiator in the event the Net Benefit To Transfer is insufficient to justify refinance.

The other contact that the bank facilitating the re-issuance would benefit from executing instead of relying on the depositor would be the actual withdrawal and transfer of funds. By receiving a signed consent and authorization to withdraw the CD early with penalty and transfer to a new CD at the re-issuing bank the bank can proceed to execute the transfer per the depositor's request. This eliminates another opportunity for the bank who issued the original CD to interfere, discourage or distract the depositor from making the re-issuance.

SUMMARY

This summary is not intended to define the scope of the invention but only assist the reader in getting a general understanding of some features of the invention before reading the full specification and claims.

In one embodiment, there is a method of re-issuing CDs by
Determining (which can also include calculating) the total current account value of a first CD as of a predetermined date;
Determining the contractual penalty for early withdrawal on said predetermined date;
Calculating the net cash value of the first CD on the predetermined calculation day by determining its total current account value and subtracting the penalty from said value;
Creating a customized second CD, using the current net cash value as initial investment, having an expiration date generally equal to the expiration of the first CD, interest handling features of the first CD and a current rate of interest offered by the re-issuing bank;
Creating an analysis which identifies the financial advantage of the second CD compared to the first even after accounting for the early withdrawal penalty of the first CD; and Issuing said second CD to the owner of the first CD using said initial investment.

Optionally, if the analysis fails to justify the current re-issuance the bank seeking the re-issuance sends the potential depositor notice, such as a thank you and an analysis of the current differential in potential financial results over the term of the CD under consideration if transferred at maturity for a new term that matches the current term of the CD. Note that a "matching" or "equal" term is not meant to be a term of exacting precision. It may mean the exact time span, but it may mean "substantially" the same time span. For example, if a terminated CD is replaced with a new one of the same number of (full or partial) months remaining, a consumer would consider it being of substantially matching or exact term. In the financial world, every day is an interest bearing or accruing day, but in the consumer's mind losses of a few weeks or a partial month would not likely be considered a substantial change in term.

Optionally, if the original CD goes to maturity at the original bank, the bank seeking the deposit sends a fresh offer to attract the transfer at maturity.

In another embodiment there is a method of retaining CD customers during periods of rising interest rates;

At periodic intervals, calculating the total current account value at a calculation date of a first CD;

Calculating the contractual penalty for early withdrawal on said calculation date;

Calculating the net cash value proceeds of the CD on the calculation date by subtracting the penalty from the total current account redemption value;

Consider a customized second CD, using the current net cash value as initial investment, having an expiration date generally equal to the expiration of the first CD, interest handling features of the first CD and a current rate of interest offered by the bank;

Creating a customized analysis which identifies the financial advantage of the second CD compared to the first even after accounting for the early withdrawal penalty of the first CD; and If the customized analysis identifies a financial advantage of the second CD, then notify holder of the first CD that a second CD is available which will outperform the first CD despite the penalty for early withdrawal; and Offering the customer said second CD having an expiration date generally equal to the first CD.

BRIEF DESCRIPTION OF THE DRAWINGS

FIG. 3 provides the underlying data in support of FIG. 4;

FIG. 4 is a chart of interest rates which compare time and interest rates, non compounded for a fictitious customer based on a fixed withdrawal penalty;

FIG. 5 provides the underlying data in support of FIG. 6.

FIG. 6 is a chart like FIG. 4 except that the interest is compounded.

Figure 1:
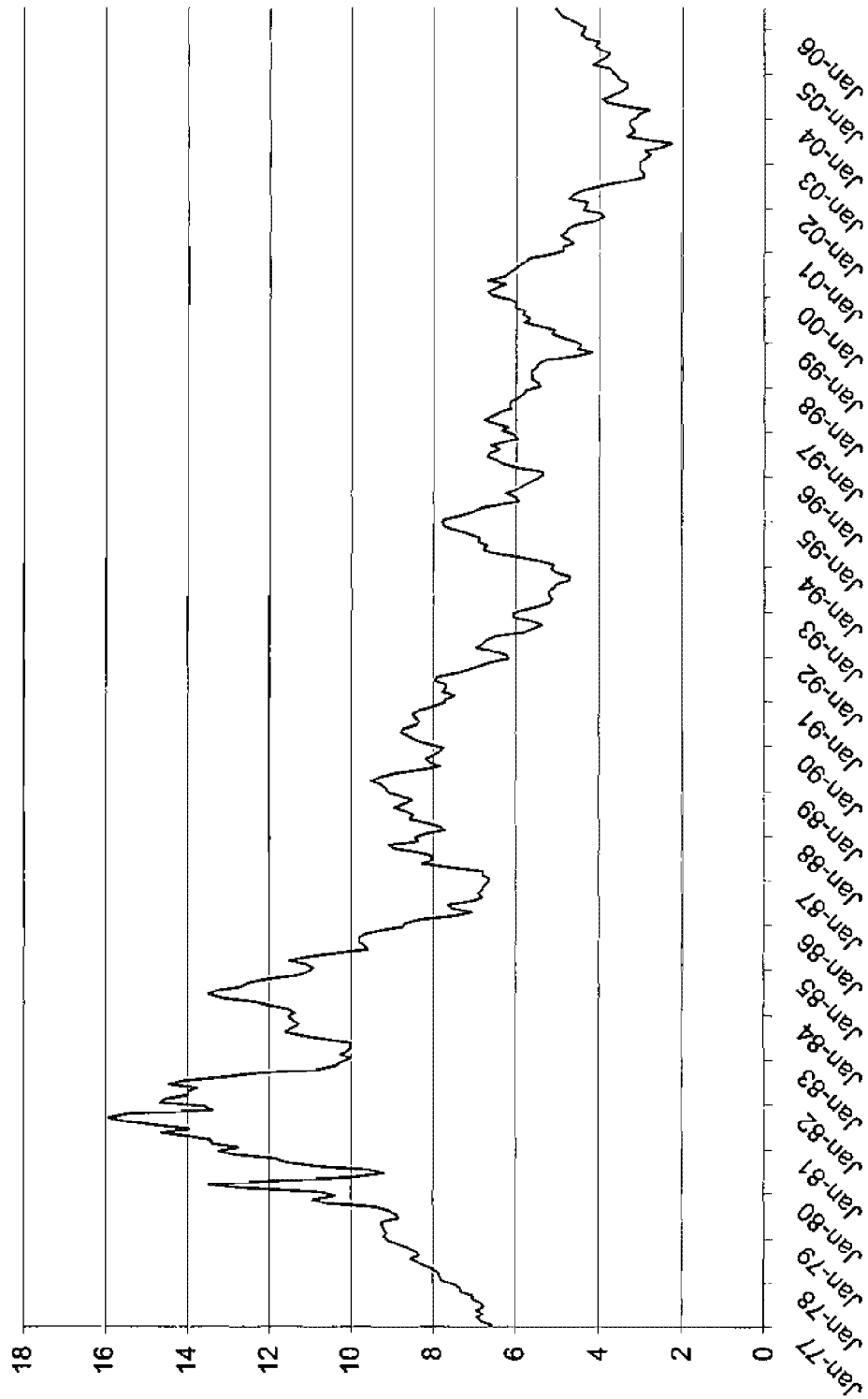
FIG. 1 is a chart of interest rates over time.

Note: these drawings are illustrative only and not intended to define the scope of the invention but only illustrate one or more embodiments.

DETAILED DESCRIPTION OF THE PREFERRED EMBODIMENTS

Financial instruments of many types are offered to buyers. This invention is intended to cover all instruments, including deposit accounts, where a buyer purchases an instrument for a period of time at an interest rate (fixed or variable). An example of such instruments is the Certificate of Deposit (CD). For convenience, we will use the term CD to mean any such instrument. This term is not intended to limit the scope of this invention but only make discussion of the invention concepts easier.

The term bank is also only a convenience. It is intended to mean any depository, not necessarily limited to a licensed depository such as a state or federally licensed bank, savings bank or credit union.

The basic model of a depository (such as a bank) is to borrow money at one rate and loan it to others at a higher rate. The borrowing and loan rates are largely dictated by market forces, but some transactions are for a fixed period of time. These fixed maturity instruments can become out of sync with market reality. Sometimes this is advantageous to the bank and sometimes to the customer. To the extent that the bank can have a degree of certainty over its cost of money for loaning to others, it can better predict how to price its loans.

Thus stability in the cost of money is key to the success of a bank. One of the most popular methods to increase bank stability at a relatively low cost is the Certificate of Deposit or CD. It is a somewhat unique financial instrument in that it is rather highly regulated by governmental agencies with respect to disclosures and limits on changes to the rules once issued. This creates a risk to banks in that in rising interest rate environments, the attractiveness to a CD holder to refinance (cancel the CD with penalty and reinvest in a new CD at a better rate) is great.

For banks issuing these instruments, the early cancellation/redemption of CDs causes the issuing bank to lose stability of its deposits and incur increased transactional costs. For competing banks, this is an opportunity to gain market share by taking deposits from the original issuing banks.

The traditional method of stopping this outflow of capital has been fear. The regulations themselves have required the words "Substantial penalty for early withdrawal" to be disclosed to the purchaser regardless of whether the penalty is really substantial. Early withdrawal penalties discourage early redemption, but at some point the interest rate differential becomes sufficiently attractive that an informed CD holder will be tempted to redeem and reissue. To encourage redemption and re-issuance at a competitor's financial institution requires a further change which will make the re-issuance clearly advantageous: the re-issuer should preferably provide that the term of the new (re-issued) CD from the new institution will expire on the date of the original CD or a time reasonably close thereto, such as the beginning or end of a month of the original term, or exactly on the date of the original term.

The effectiveness of the penalties in holding the CDs during a rise in rates is a function of the penalty structure, rate and remaining term. Ignoring the present value impact, the general effectiveness of penalties can be calculated by:

(CD Interest Rate×Penalty in Months/12)/Number of Years Remaining

Examples therefore include: A 3% CD with a 6-month early withdrawal penalty and 2 years remaining has protection for a 75 basis point increase in yields. A 3% CD with a 3-month penalty and 3 years remaining has protection of 25 basis points. A 3% CD with an 18-month penalty and 3 years remaining has protection of 150 basis points.

CD yields vary over time for any bank. Banks adjust the interest they pay on CDs for many reasons. Deposits represent a major portion of the funding source for banks. By increasing interest rates offered on deposits banks seek to attract more funding and by lowering interest rates offered on deposits they seek to lower funding costs. Banks may adjust rates for many factors including local deposit competition, national interest rate markets, investment opportunities and loan demand.

CD yields vary materially between banks. Historical surveys of interest rates offered on CDs reveal significant variances between banks. On Jun. 1, 2006 a survey was done of 3-year CD offerings posted on the web sites of the current largest 12 issuers of FDIC-insured time deposits. Offerings were not posted on the web sites for all of these banks. It is likely that banks tend to post offerings they believe are attractive and withhold offerings they do not consider attractive. One might assume that the offerings not posted were relatively low. Of the banks who did post their rates, the yields on their 3-year CD offerings varied from 3.26% to 5.25% Annual Percentage Yield. There was 199 basis points of difference between the lowest and highest observed APY for the exact same investment offered from two of the top issuers in the U.S. on that day. The highest yield observed was 61% higher than the lowest.

CD yields may vary materially within individual banks by term. Of the banks surveyed one of the banks offered an 11-month CD paying 3.45% APY while their 12-month CD was offered at 4.95% AND the 12-month had a special BUMP feature to enhance it. This 150 basis point differential was not supported by the slope of the yield curve from 11-months to 12-months. The rate differential attributable to the yield curve as defined by the London InterBank Offering Rate was less than 2 basis points.

Yield differentials between currently outstanding deposits or presently offered CDs and presently offered high-yielding CD alternatives provide an opportunity for depositors to enhance the value of their investments while remaining in safe and secure FDIC-insured investments. To accelerate the transition to higher yielding CDs a customized monetary measure of the financial impact will allow depositors to more effectively respond to the opportunities that currently exist for them. This invention clearly identifies the monetary impact opportunity that APY alone does not.

Due to the structural differences between compounded CDs and CDs which are not compounded the basis of comparison is different between the two. For compounded CDs the value at maturity is the best basis of comparison for an original and a customized CD alternative designed to mature on the same date. Due to the accumulation of value into the total current account value at maturity of both CDs a comparison of the two values at maturity will clearly identify the preferred investment and define the amount of competitive advantage of the preferred investment. FIGS. 3 and 4 illustrate the effect of compounding on when the "break point" (the point at which issuing a new CD is advantageous. The figures use sample data for illustration of the concept. The break point is shown by virtue of the change in font or color in the figures.

CDs which are not compounded can be compared by considering future earnings of the two investments less the amortized cost of any applicable early withdrawal penalty associated with re-issuance of any outstanding CD applied to the re-issued CD.

The opportunity to create a net benefit to transfer an existing certificate of deposit depends upon the amount of the deposit; the current yield; the amount of time remaining before maturity; the early withdrawal penalty; and the new market-rate yield available for the remaining term. The result is a net benefit to transfer.

Compounding can also play a factor in whether there is a net benefit to the customer. A compounded CD reinvests the interest in the CD and generates additional gain at maturity. Therefore, if a customer were to replace a non compounding CD with a compounding one, a smaller interest rate differential (between new and old rates) might create a sufficient net benefit to the customer to redeem the first CD in favor of a new one.

By creating a data table of alternative refinancing dates and refinancing rates, potential scenarios can be evaluated and compared to the current net benefit to transfer opportunity. For each unique CD this table presents a differential analysis between results of refinance date and rate combinations. In other words you can determine from a quick analysis of this table how much rates must rise as time passes to maintain or improve the refinance opportunity. One can also identify the amount the opportunity diminishes as time passes without rate changes or with rate reductions.

The optimal time to refinance is dependent upon actual available market rates of interest over the remaining life of the deposit. A depositor can highlight in the data table their forecast of rates at the intersection of date and rate for each remaining date of the CD. Under the rate scenario defined by this exercise the optimal refinance date is determined by selecting the date that has the highest highlighted positive net benefit to transfer. Caution should be taken in interpreting any results based upon interest rate forecasts.

FIG. 1 illustrates general flow of interest rates over the most recent 29 year period. At the time of this writing interest rates appear to be headed for a general rise. This will make the applicability of this invention even greater as CDs issued in a lower interest rate environment have or will become vulnerable.

One feature of the present invention is to offer a reissue CD to the current CD holder which is customized to the date of expiration of the current CD. With this feature, the redeemer can more clearly compare the benefit of the bargain for re-issuing and will also be able to maintain whatever financial plan they created when the original CD was purchased. For example, a party may purchase a CD to expire at the time a loan balloon (on some other loan) will come due, or other financing need. If the re-issued CD would have to restart the holding period, and the expiration date would, only by chance, be the same as the depositor's need for the funds.

Notice also, that while I have discussed the invention in terms of CD's, it is also applicable to instruments like mortgages, and other time fixed instruments, where the holder may wish to re-issue but not extend the financing term. For example, a 30 year mortgage, if re-issued after 10 years and 27 days, may only be available in 10, 15 and 30 year increments, but according to the invention, it could be re-issued for the exact remaining term as the original instrument.

Thus a party can continue to re-issue its CDs or other instruments and still be assured that the expiration/maturity date will remain fixed, thereby reducing one of the complicating impediments to redemption and re-issue.

For the purpose of attracting new CD funds one method of calculating whether it is desirable to re-issue the CD is Determining (or calculating) the total (unaccrued) current account value of a first CD as of a predetermined calculation date. The total current account value amount is that portion of the CD which would generate revenue in the future from the calculation date to normal maturity.

Determining the contractual penalty for early withdrawal on said predetermined date. This is usually a clause in the issuing contract.

Calculating the net cash value of the first CD on the predetermined calculation day by determining its total current account value and subtracting the penalty from said value. This is the net cash value which a CD redeemer would expect to receive in hand. It is also the typical starting investment in the second (re-issued) CD.

Creating a customized second CD, using the net cash value as initial investment, having an expiration date generally equal to the expiration of the first CD, interest handling features of the first CD and a current rate of interest offered by the re-issuing bank; The expiration date does not have to be exactly the same. For example, the end or the beginning of the month of the original CD might be convenient for the holder. It could be longer or shorter if that was deemed a marketing advantage, such as offering an greater interest rate for a longer term or a shorter term and a lower interest rate as an incentive to a holder who can't hold for the original term but can be maintained as a customer on a shorter term instrument. In such case, the bank retains a customer and does not lose the capital.

The interest rate can be at "market" which might be the prevailing rate on that date for the bank or some other market rate calculation. It can also be above or below market so long as there is some incentive for the holder to re-issue to that bank.

Creating a customized analysis which identifies the financial advantage of the second CD compared to the first even after accounting for the early withdrawal penalty of the first CD; and Issuing said second CD to the owner of the first CD using said initial investment or, at the bank's option, at a higher or lower initial investment. If lower, the holder gets cash back or cash out at the re-issuance, which could be a significant advantage.

If the analysis fails to justify the current re-issuance the bank seeking the re-issuance sends the potential depositor a thank you and an analysis of the current differential in potential financial results over the term of the CD under consideration if transferred at maturity for a new term that matches the current term of the CD. This is accomplished by comparing the currently quoted yield on the depositor's current term at the current bank of deposit and the yield available from the bank seeking the re-issuance for the same term.

If the original CD goes to maturity at the original bank, the bank seeking the deposit sends a fresh offer to attract the transfer at maturity. This offer would be timed a few weeks before maturity and would present an offer that could be redeemed anytime through the grace period of the maturity of the original CD.

When a financial institution seeks such re-issuances, it also creates the side effect that the purchaser is now much more savvy and more likely to re-issue the certificate again as soon as interest rates dictate.

The present invention contemplates this condition and deals with it in a number of ways.

First, the bank does not need to provide the re-issued instrument with the same withdrawal penalty rules. The bank will offer a standard early withdrawal penalty appropriate for the term of each CD.

Depositors may request an alternative early withdrawal penalty for the new account. The concept of a plurality of alternative penalty options for the CD issuer to offer also forms a portion of this invention in one embodiment. The depository may make available other penalty options subject to alteration of the interest rate, APY and the net benefit to transfer.

Although standard early withdrawal penalties will be set by term to maturity, alternative penalties will be available with compensating interest rate and APY adjustments. More significant penalties will generally allow the bank to issue higher APY. Conversely, less significant penalties will be compensated for with lower APY offerings.

The present invention includes computer code to carry out the method of calculating the optimal time to re-issue. Instead of discouraging a customer from re-issuing, in one embodiment the bank may include a notification feature which advise the customer automatically when re-issuing would be profitable. Computer code would monitor current interest rates and penalty scheme of the CD and when there was justification for a re-issue, notify the CD holder. (Justification would be, at a minimum when the reissued CD would have a total future interest accumulation at least as great as the current CD's remaining term, taking the penalty into account). Of course, the justification will increase as the new CD's accumulated interest further exceeds the benefit of doing nothing.

In one such embodiment there is a method of retaining CD customers during periods of rising interest rates by:

At periodic intervals (for example, daily), calculating the total account value on the calculation date.

Calculating the contractual penalty for early withdrawal on said calculation date;

Calculating the net cash value proceeds of the CD on the calculation date by subtracting the penalty from the total current account value;

Consider a customized second CD, using the current net cash value as initial investment, having an expiration date generally equal to the expiration of the first CD, interest handling features of the first CD and a current rate of interest offered by the bank;

Creating a customized analysis which identifies the financial advantage of the second CD compared to the first even after accounting for the early withdrawal penalty of the first CD; and Comparing said total value at maturity of the first CD with a second CD issueable on calculation date from net proceeds of the first CD at an interest rate selected by the issuer having a term expiring generally equal to the term of the first CD; (of course, the terms could vary, per above).

If the customized analysis identifies a financial advantage of the second CD, compared to the first CD, then notify holder of the first CD that a second CD is available which will outperform the first CD despite the penalty for early withdrawal; (notification could be by phone, email, fax, RSS, or means not yet invented and Offering the customer said second CD having an expiration date generally equal to the first CD (or with some other expiration date and with a possible cash out option, per above).

While it would seem illogical to remind customers of the possibility of a reissue, one must assume the customers who have already been influenced by the possibility of reissue, will do so again, and failing to provide this information simply opens the door for a savvy competitor. The objective is to hold one's customer base and not have it taken away by a competitor. The cost of re-issuing a CD (or other instrument) to an existing customer is far lower than the cost of finding a new customer to do so.

The actual negative impact to the bank would be minimized if the depositor refinanced the bank's own CDs every time the refinance was marginally beneficial. If a depositor waits for more material interest rate increases the detrimental impact to the bank increases. Encouraging the customer to refinance promptly when a positive net benefit to the customer occurs creates customer loyalty and benefits the bank in the long-run simultaneously.

The present invention, in one embodiment, includes several means for maintaining customer loyalty.

Another embodiment could discourage reissuance by a competitor by offering an interest rate which is more attractive (i.e. greater) than market rates. The bank could only offer such a rate if was compensated by other factors, such as greater interest forfeiture on early redemption or holding a call or conversion option.

If the depositor seeks additional yield the depository may provide a premium yield option by the bank retaining a call or conversion option. Appropriate disclosures will be used to communicate the risk and reward of this premium yield option. The bank is rewarded for issuing a premium yield CD if the CD is callable so that the risk is limited. A conversion feature would have a similar effect.

Since CD offers are not currently customized by potential transaction, there is no need to track individual bank offers. With customized offerings on the basis of amount, term, rate/APY, early withdrawal penalty, call features and other potential details, the bank will need a tracking/reservation system to provide a method of honoring customized quotations for a reasonable period of time to allow for delivery of the funds. We will refer to this as a quote reservation system wherein the bank will keep a data base of customized offers it has made to customers, most of which will expire in 30-60 days at which time they may be purged from the quote system.

To enhance renewal at maturity the bank could waive early withdrawal penalties for immediate renewal. This latter inventive concept is particularly desirable by providing a pathway for the incumbent bank (the current issuer) to hold onto the customer by offering an early redemption before the normal expiration date with a minimal penalty (or by waiving the penalty altogether) in lieu of the sale of a new instrument of greater length.

By this means, the incumbent bank gets a "jump" on the competition by interceding through offering to reissue the CD before the customer has begun to look at options from competitors. This method is particularly useful where customer loyalty and continuity is prized by the bank.

Figure 2:
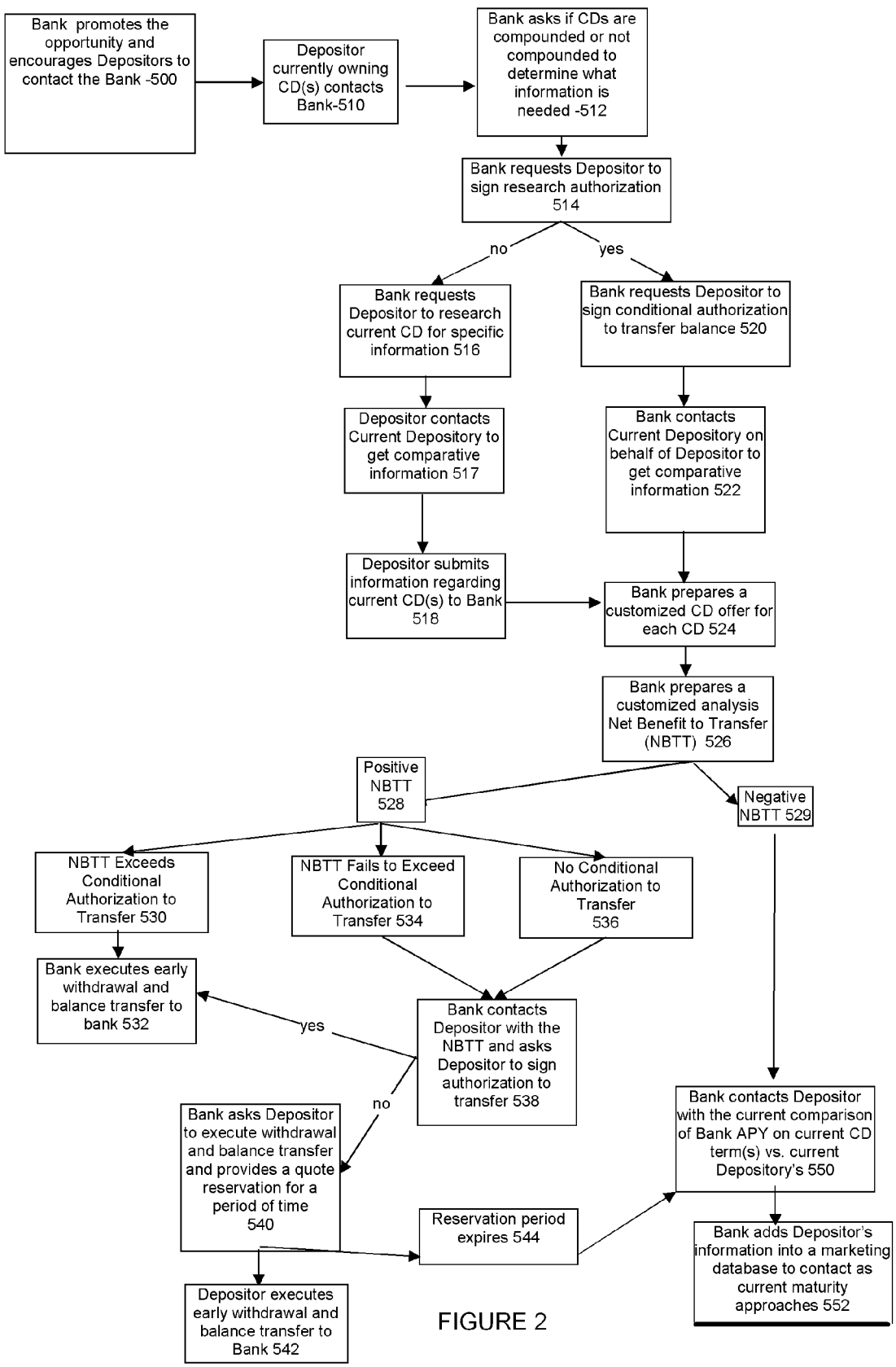
FIG. 2 is a flow chart of one embodiment of the present invention.

In FIG. 2, one embodiment of the present invention is illustrated:

Typically, the depository institution (I will call bank, as broadly defined) encourages current time deposit holders to contact them to determine the magnitude of their current financial opportunity (500). When contacted, the bank requests that the deposit holder give them consent and authorization to investigate the existing parameters of each of their time deposits or that the depositor provide this information for the required analysis from their own records or research (510, 512, 514). This is preferable since it allows the bank flexibility in response, as will be indicated below.

If the depositor agrees, the path along block 520 is selected, otherwise, the path along block 516 is followed. In the later case, the depositor makes contact with his/her bank (517) and provides this information to the new bank (518). This is not preferred because the depositor is subject to influence by the originally issuing bank and the data provided may be sufficiently confusing so as to stop a possibly beneficial transaction, or the original bank may capture the reissue (one preferred embodiment which prevents a loss of funds at said original issuing bank).

In the alternative case (520), the depositor authorizes the new bank to obtain the necessary data and make an offer (Net Benefit to Transfer—NBTT) (522, 524, 526, 528, 529). The new bank is entitled to provide marketing data to the customer to try to influence their decision, but the factual data must be exact so to not run afoul of banking law or securities regulations of the territory.

The bank offers a customized time deposit based on the dimensions of the existing deposit. In one embodiment, the new account deposit amount will be same as the current funds available from the existing time deposit account after paying any applicable early withdrawal penalty. In another embodiment, the deposit amount can be less. For example, in a rising interest rate environment, the new CD will produce enough interest income in a shorter length of time (relative the original CD) that the bank can achieve the same total interest over the life of the CD that the initial capital investment can be reduced. One option is for the customer to keep cash at reissuance, in the amount of this differential. The alternative is that that cash amount would be retained as part of the capital investment and the interest accrued will exceed that of the original CD.

In one embodiment, the expected new account maturity date will match the existing deposit next maturity date. The expected method and timing of paying interest or compounding will be the same as the current deposit account. The offer will be based on the new depository's standard early withdrawal penalty structure. This standard penalty need not be at all like the prior penalty, whether this is a reissue from the same bank or a competitor. Indeed, having a stiffer penalty which will diminish the incentive to reissue optionally coupled with (alternatively) a higher rate as an enticement, may keep funds in place longer despite rising interest rates.

The bank provides a customized analysis of the net benefit to transfer as well as the APY of the new investment and all other Regulation DD requirements (526). The customized net benefit analysis will monetize the benefit of withdrawing and transferring the funds to the new depository.

In the event of a positive NBTT, the depositor withdraws early (530, 532), the penalty is paid and the new CD is issued, usually for the remaining term of the original CD.

If the NBTT is not sufficient to warrant an early withdrawal and transfer, (534), the transfer authorization is cancelled (536) or the new bank can request authorization for transfer of funds anyway, (538) such as if there are other benefits for the transfer, such as an above market interest rate with call features retained by the bank as an enticement to the depositor to switch to the new bank. This may be advantageous to the new bank because of the value of brand (bank) loyalty.

In such case, the bank makes the transfer or offers a quotation to the depositor with an expiration period, (reservation of time) 540. If completed 542, the new CD is issued. If not, because of expiration, (544), the bank advises the depositor (550) but may maintain the contact name in its data base to make contact at a time approaching the original expiration date (552). This last step is particularly useful in capturing a customer who obtains a free analysis of his/her CD and may have a higher trust level in the new bank. If the new bank promises to provide such analysis even on its own CD's, the customer would have a strong incentive to switch issuers at the next opportunity (expiration).

The invention envisions that alternative early withdrawal penalties may be an option, either at the request of the holder or the bank.

The holder may also be encouraged to add to the initial investment by adding principal to the starting deposit of the reissued CD. This may allow the bank to offer some reciprocal advantage to the depositor such as higher interest rate, relaxed withdrawal penalty, etc.

One variation of the invention is cash out option. This is accomplished simply by not reinvesting all the cash available after the withdrawal. Instead the depositor invests only the amount needed to create the same future value as the original CD. The remainder becomes the Immediate Cash Reward (cash out). This option creates immediate gratification. The investor has fresh cash in their pocket and realizes the original CD's investment value at maturity. The depository using the invention would prefer that the depositor not take this option because it reduces the deposits.

Another aspect of the invention is the creation of a premium yield option. If the customer will accept a greater penalty for early termination/withdrawal the bank has greater assurance that the funds will remain on deposit for the full term of the CD and will therefore be willing to offer a higher interest rate. Therefore, in one embodiment, the prior CD is redeemed and a replacement CD is issued, the penalty term of the replacement CD may be greater than the original CD early termination penalty. In such case the interest rate offered on the replacement CD will be greater than the rate which would have been otherwise offered if the penalty was equal to or less than the penalty of the original CD (such as the market rate.

Another aspect of the invention involves a call or conversion option. In the event that interest rates decline, it may be advantageous for a bank to call the CD and force redemption or other forced conversion. The other conversion may also be the forced issuance of a new deposit account at a lower rate. Customers may be willing to accept such a feature especially if the interest rate is increased over the market rate to justify the additional risk to the customer and the decreased risk to the bank.

Another aspect of the invention relates to a maturity monitoring marketing list database system. If a current CD customer or a future customer prospect owning CDs at another financial institution, is known to the bank, it would be possible to enter the customer's contact information with knowledge of the customer's current CD portfolio. When market conditions dictate the customer can be offered a replacement CD product offering which may have an expiration date coterminous with the customer's current CD. For international customers, a change in interest rates between different currencies may trigger a market opportunity to convert a CD in one currency to another, where the market rate on that currency may be advantageous (I have no basis to defend the validity of this statement).

This "maturity monitoring marketing list database" which would monitor the maturity of off site CDs (or other time deposit monies) would put the bank in a position to gain early access to customers before their current institution contacts them for renewal.

As part of the maturity monitoring marketing list database system or independent thereof, the bank could obtain a transfer authorization simultaneously with entry of the customer into the bank's data base of prospective customers with CDs from other institutions. If the bank holds legal authorization form the customer, then an offer of a replacement CD to the customer can be executed upon a verbal, email or other simple customer instructions. Of course the bank will want to use a method of verifying the existence and/or authenticity of the instruction, such as by a verification parameter (social security number in the US or other alphanumeric codes, IP address, etc.) or biometric data (voice print etc).

The invention claimed is:

1. A computer implemented method for presenting opportunities to depositors to exploit financial options in conventional financial institution certificates of deposit, the method comprising:

receiving consent from an owner of a first certificate of deposit ("CD") to allow a depository institution to investigate existing parameters of said first CD with parameters of a customized replacement CD;

calculating, by a processor, a current account value of the first CD as of a predetermined date, the current account value being equal to a principal plus an accrued interest;

calculating, by said processor, a contractual early withdrawal penalty of said first CD on said predetermined date;

calculating, by said processor, a net account liquidation value of the first CD on the predetermined date by determining the current account value of the first CD and subtracting the contractual early withdrawal penalty from said current account value of the first CD;

formulating, by said processor, financial terms of said customized replacement CD using the net account liquidation value as an initial investment, the financial terms having an expiration date equal to an expiration date of the first CD and a current market rate of interest that will yield a value at maturity of said customized replacement CD that is more than an anticipated value at maturity of the first CD even accounting for the early withdrawal penalty of the first CD;

generating, by said processor, the financial terms of said customized replacement CD using said initial investment to occur at the expiration date and an analysis of a net benefit to transfer associated with the customized replacement CD; and presenting said analysis of said net benefit to transfer of the customized replacement CD to said owner of the first CD, said net analysis to transfer including a value differential between said anticipated value at maturity of said first CD and said value at maturity of said customized replacement CD.

2. The computer implemented method of claim 1, wherein presenting said analysis of said net benefit to transfer further comprises presenting, in response to an investigation of said existing parameters of said first CD with said parameters of said customized replacement CD, said analysis of said net benefit to transfer of the customized replacement CD to said owner of the first CD, said net analysis to transfer including a value differential between said anticipated value at maturity of said first CD and said value at maturity of said customized replacement CD.

3. The computer implemented method of claim 1, further comprising:

determining, by said processor, when said value at maturity of said customized replacement CD is higher than said anticipated value at maturity of said first CD, said value at maturity of said customized replacement CD based upon one or more current interest rates; and automatically notifying, by said processor, said owner of said first CD when said value at maturity of said customized replacement CD is higher than said anticipated value at maturity of said first CD.

4. The computer implemented method of claim 3 wherein: said customized replacement CD has an interest rate above a prevailing market rate for CDs and has a penalty for early withdrawal which is more punitive than the penalty of the first CD, so that a holder of the customized replacement CD will be less likely to seek to re-issue the customized replacement CD when an interest rate increases.

5. The computer implemented method of claim 1 wherein an issuer of the first CD and said customized replacement CD are the same or related parties and wherein the issuer waives the early withdrawal penalty in lieu of issuance of the seeefid customized replacement CD.

6. The computer implemented method of claim 1 wherein said initial investment is reduced to an amount sufficient to produce a customized replacement CD with generally a same value at maturity as the anticipated value at maturity of the first CD.

7. The computer implemented method of claim 3, further comprising:
   storing financial parameters of said customized replacement CD;
   reserving an offer period to purchase said customized replacement CD for a predetermined period of time from a date of quotation;
   receiving an authorization within said predetermined period of time from said owner of said first CD to issue said customized replacement CD; and
   redeeming the first CD and paying said contractual early withdrawal penalty of said first CD to an institution that issued said first CD from proceeds associated with said redemption of said first CD; and
   issuing said customized replacement CD using said initial investment for said customized replacement CD.

8. A computer executable program embodied on a non-transitory computer readable medium for replacing a CD at the optimum point at which a CD holder would expect to benefit from a customized replacement CD due to forward implied interest rate expectations, comprising:
   computer executable code to cause a processor to calculate an anticipated value at maturity of a first CD from a predetermined date to a maturity of the first CD;
   computer executable code to cause the processor to calculate a contractual early withdrawal penalty on the predetermined date;
   computer executable code to cause the processor to calculate a net account liquidation value of the first CD on the predetermined date by determining a current account value of the first CD and subtracting the contractual early withdrawal penalty from the current account value;
   computer executable code to cause the processor to calculate a customized replacement CD, using the net account liquidation value as an initial investment, having an expiration date generally equal to an expiration date of the first CD and an interest rate that is equal to a forward implied CD yield that produces a value at maturity of the customized replacement CD that is greater than the anticipated value at maturity of the first CD even accounting for the contractual early withdrawal penalty of the first CD;
   computer executable code to cause the processor to generate a net benefit to transfer associated with the customized replacement CD, the net benefit to transfer including a value differential between the anticipated value at maturity of the first CD and the value at maturity of the customized replacement CD;
   computer executable code to cause the processor to determine when the value at maturity of the customized replacement CD is higher than the anticipated value at maturity of the first CD, the value at maturity of the customized replacement CD based upon one or more forward implied interest rates;
   computer executable code to cause the processor to automatically notify an owner of the first CD when the value at maturity of the customized replacement CD is higher than the anticipated value at maturity of the first CD; and
   computer executable code to cause the processor to present the net benefit to transfer to the owner of the first CD.

9. The computer executable program of claim 8 wherein a call or conversion option compensates a depositor with an interest rate on a customized replacement deposit account that is above a prevailing interest rate for CDs without such options.

10. The computer executable program as recited in claim 8, wherein a maturity date of said customized replacement CD is exactly equal to the expiration date of the first CD.

11. A computer implemented method for maintaining depositor loyalty within a single depository institution, the method comprising:
   receiving a consent to allow the single depository to investigate existing parameters relating to a first certificate of deposit ("CD") that has been previously issued to an owner of the first CD from the single depository institution and a conditional authorization to transfer when a value at maturity of a customized replacement CD is higher than a value at maturity of the first CD;
   calculating, by a processor, a current account value of the first CD as of a predetermined date, the current account value being equal to a principal plus an accrued interest;
   calculating, by the processor, a contractual early withdrawal penalty of the first CD on the predetermined date;
   calculating, by the processor, a net account liquidation value of the first CD on the predetermined date by determining the current account value of the first CD and subtracting the contractual early withdrawal penalty from the current account value of the first CD;
   formulating, by the processor, financial terms of the customized replacement CD using the net account liquidation value as an initial investment, the financial terms having an expiration date equal to an expiration date of the first CD and a current market rate of interest that will yield a value at maturity of the customized replacement CD that is more than an anticipated value at maturity of the first CD even accounting for the early withdrawal penalty of the first CD, the financial advantage comprising a value differential between the anticipated value at maturity of the first CD and the value at maturity of the customized replacement CD;
   generating, by the processor, the financial terms of the customized replacement CD to occur at the expiration date using the initial investment and an analysis of a net benefit to transfer associated with the customized replacement CD, the analysis identifying the financial advantage of the customized replacement CD; and
   issuing, by the processor, the customized replacement CD from the single depository institution based upon the financial terms to the owner when the conditional authorization is obtained.

12. The computer implemented method as recited in claim 11, wherein formulating the financial terms of the customized replacement CD includes continually monitoring, by the processor, the current market rate of interest to formulate the financial terms of the customized replacement CD using the net account liquidation value as an initial investment, the financial terms having an expiration date equal to an expiration date of the first CD and a current market rate of interest that will yield a value at maturity of the customized replacement CD that is more than the anticipated value at maturity of the first CD even accounting for the early withdrawal penalty of the first CD, the financial advantage comprising a value differential between the anticipated value at maturity of the first CD and the value at maturity of the customized replacement CD.

* * * * *